United States Patent
Jonsson et al.

(10) Patent No.: US 6,385,585 B1
(45) Date of Patent: May 7, 2002

(54) EMBEDDED DATA IN A CODED VOICE CHANNEL

(75) Inventors: Björn Jonsson, Järfälla; Jan Swerup, Knivsta; Krister Törnqvist, Sköndal; Per-Olof Nerbrant, Österskär, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/708,011

(22) Filed: Nov. 8, 2000

Related U.S. Application Data

(62) Division of application No. 08/990,773, filed on Dec. 15, 1997.

(51) Int. Cl.[7] ............................................. G10L 19/02
(52) U.S. Cl. ...................................................... 704/275
(58) Field of Search ................................ 704/270, 275, 704/276, 251, 255, 231, 237, 243

(56) References Cited

U.S. PATENT DOCUMENTS

| | | |
|---|---|---|
| 3,649,765 A | 3/1972 | Rabiner et al. |
| 4,346,262 A | 8/1982 | Willems et al. |
| 4,506,379 A | 3/1985 | Komatsu |
| 4,625,286 A | 11/1986 | Papamichalis et al. |
| 4,715,004 A | 12/1987 | Kabasawa et al. |
| 4,852,170 A * | 7/1989 | Bordeaux .................... 381/41 |
| 4,914,702 A | 4/1990 | Taguchi |
| 4,945,568 A | 7/1990 | Willems |
| 5,146,539 A | 9/1992 | Doddington et al. |
| 5,255,339 A | 10/1993 | Fette et al. |
| 5,257,397 A | 10/1993 | Barzegar et al. |

(List continued on next page.)

FOREIGN PATENT DOCUMENTS

| | | |
|---|---|---|
| DE | 2659674 A1 | 7/1978 |
| EP | 0 507 684 A1 | 10/1992 |
| GB | 2290005 A | 12/1995 |
| GB | 2323693 A | 9/1998 |
| WO | WO 93/21721 | 10/1993 |
| WO | WO95/177465 | 6/1995 |
| WO | WO 96/09708 | 3/1996 |
| WO | WO 96/18275 | 6/1996 |
| WO | WO98/34217 | 8/1998 |

OTHER PUBLICATIONS

Michele Borgatti, et al., "A Low–Power Integrated Circuit for Remote Speech Recognition," IEEE Journal of Solid–State Circuits, vol. 33, No. 7, Jul. 1998, pp. 1082–1089.

"Industry Support for Wireless Application Protocol Gains Momentum", http://www.xwap.com/pressrel/jul07.html, Press Release Jul. 7, 1997.

"Architecture for Wireless Application Protocol Published on the World Wide Web", http://www.xwap.com/pressrel/sep15971.html, Press Release Sep. 15, 1997.

*Primary Examiner*—William Korzuch
*Assistant Examiner*—Abul K. Azad
(74) *Attorney, Agent, or Firm*—Burns, Doane, Swecker & Mathis, L.L.P.

(57) ABSTRACT

A digital input symbol is transmitted to a receiver by determining one or more formant frequencies that correspond to the digital input symbol. In one embodiment, a pre-programmed addressable memory is used to map the set of possible digital input symbols onto a set of corresponding speech units, each comprising a superposition of one or more formant frequencies. A signal is then generated having the speech units. The signal is supplied for transmission over a voice channel. This may include supplying the signal to a voice coder prior to transmission. In another aspect of the invention, a forward error correction code (FEC) is determined for the digital input symbol, and the one or more speech units are modified as a function of the forward error correction code. In this way, the FEC may also be transmitted with the encoded input symbol. The modification may affect any of a number of attributes of the speech units, including a volume attribute and a pitch attribute.

4 Claims, 9 Drawing Sheets

U.S. PATENT DOCUMENTS

| | | |
|---|---|---|
| 5,347,611 A | 9/1994 | Chang |
| 5,426,460 A | 6/1995 | Erving et al. |
| 5,438,535 A | 8/1995 | Lattibeaudiere |
| 5,563,664 A | 10/1996 | Yang et al. |
| 5,590,161 A | 12/1996 | Meyn et al. |
| 5,590,406 A | 12/1996 | Bayley et al. |
| 5,703,311 A | 12/1997 | Ohta |
| 5,750,912 A | 5/1998 | Matsumoto |
| 5,797,116 A | 8/1998 | Yamada et al. |
| 5,799,279 A * | 8/1998 | Gould et al. .................. 704/275 |

* cited by examiner

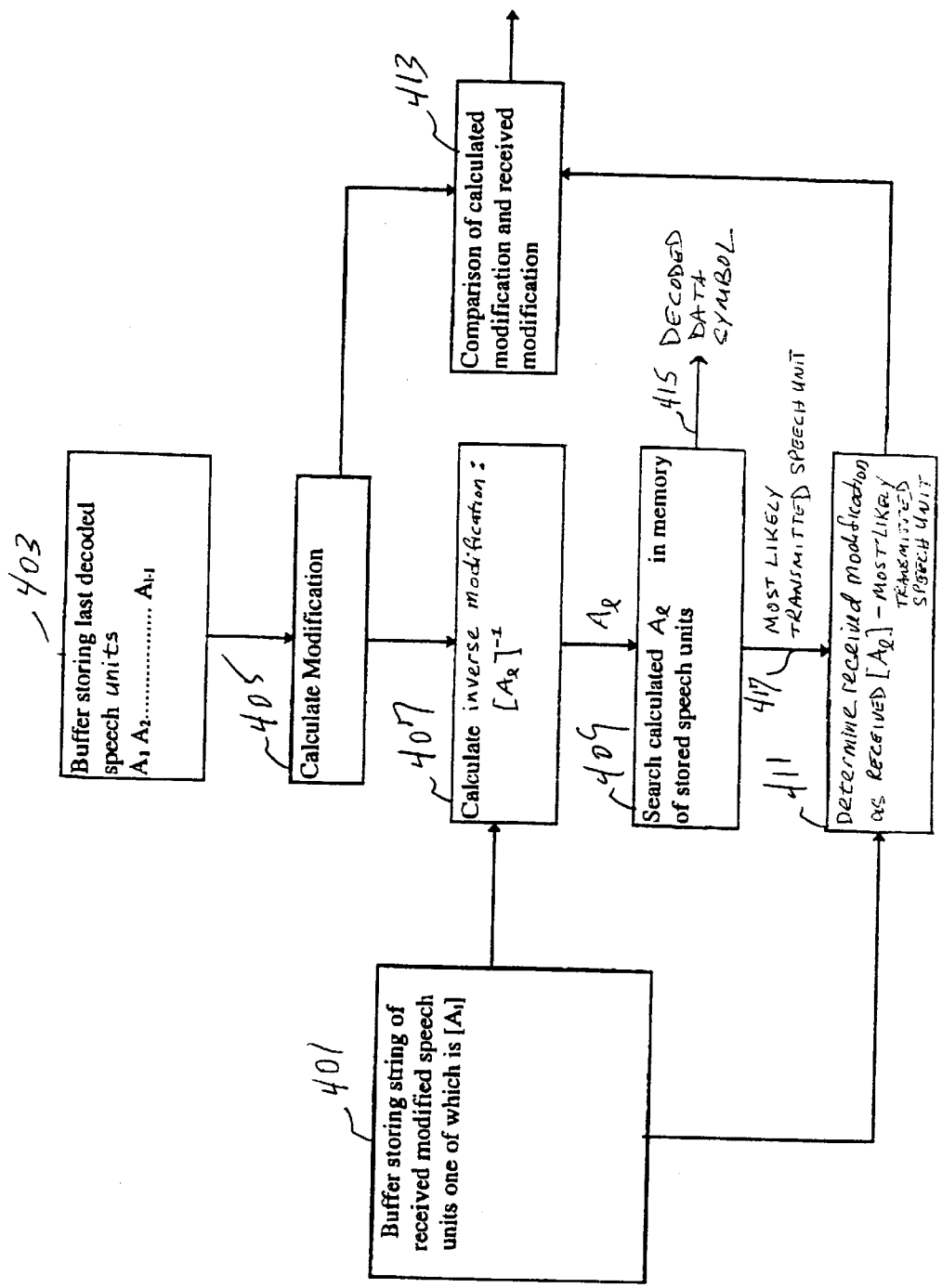

EMBEDDED DATA IN A CODED VOICE CHANNEL

This Application is a Division of Ser. No. 08/990,773 filed Dec. 15, 1997.

BACKGROUND

The present invention relates to techniques for communicating digital information, and more particularly to techniques for communicating digital information over a coded voice channel.

There is an increasing demand for advanced telephony services from customers, such as automated services that may be accessed and commanded by control sequences that are transmitted from a remote location. As a consequence, techniques have been developed for providing access to services from a communications network. In the world of wireless communication, ongoing work includes the development of a Wireless Application Protocol (WAP), which is a layered communication protocol that includes network layers (e.g., transport and session layers) as well as an application environment including a microbrowser, scripting, telephony value-added services and content formats. One part of WAP is the Telephony Value Added Services (TeleVAS), which is a secure way to access local functions like Call Control, Phonebook, Messaging and the like by means of a device independent interface to the underlying vendor specific operating system and telephony subsystem.

In fixed networks, techniques for providing access to services from a communications network have included the use of Intelligent Networks in which Service Access Points are nodes in the network that customers can access to obtain advanced services. It has also become common to access services at nodes that are independent of any traditional network operator. These nodes are implemented as service computers that can be connected in independent computer networks (e.g., the Internet) and accessed from at least one communications network (e.g., a telephony network or a mobile network such as the European standard Global System for Mobile Communication (GSM)). The communications network (e.g., a public telephony network or a mobile network) is then only utilized for establishing access to these independent computer networks. In order to keep the services provided by the network of service nodes independent of the traditional telecommunication networks, the access to a service node through such a telecommunications network can carry both data (e.g., speech) and control signaling on the same channel (i.e., in-band signaling can be applied).

In a cellular communications system, it is common for operators to offer a Short Message Service (SMS) for sending short messages to the cellular terminal. The messages are routed over a Short Message Service Center (SMS-C) server that stores and forwards the messages. The SMS service has several disadvantages with respect to the problem of exchanging control signals between a user terminal and a service node. For example, the SMS service does not render the sender any control of delays, and it provides no information about the status of the message. Furthermore, the pricing of the SMS service differs substantially from one operator to the next, with some operators keeping the price at a level that makes the service too expensive for many users. Another disadvantage is that various cellular network operators offer interfaces other than the SMS-C interface, from servers outside the cellular network, which means that it is cumbersome to send SMS messages to terminals belonging to different networks.

It is further known how to establish separate voice and data paths between two terminals through a plurality of telecommunication networks, one of which is a mobile network. However, the switching between the two modes is awkward and time consuming, which causes inconveniences to the user.

Whereas systems such as Internet Protocol (IP) communication can easily cope with mixed speech and data, this presents problems if the communication path includes a mobile network, such as a GSM network. More particularly, in this latter case the communication path includes a voice coder that is optimized for human speech and thus in-band modem signaling by means of, for example, tone frequencies (e.g., Dual Tone Multi-Frequency, or "DTMF") will result in a slow data rate at the risk of an increased error rate. A reason for this is that the character of a modem signal makes it less predictable than a voice signal. Known methods for managing these difficulties suffer from being impracticable from a user point of view or otherwise lead to technical solutions that are specific for each type of network involved. Further, future voice coders may behave even more unfavorably with respect to the ability to pass DTMF signals. Therefore, in-band signaling In communication paths comprising a plurality of networks, at least one including voice coding, is a problem to which an advantageous solution is needed.

The PCT Publication No. WO96/09708 by Hamalainen et al. ("Simultaneous Transmission of Speech and Data on a Mobile Communications System) describes how to use a voice channel over an air interface in a mobile system to transmit simultaneous voice and data, and in particular discloses a method and system whereby silent periods can be detected when no voice is present, thereby allowing the insertion of data into the transmitted frames. This publication further describes how the frames are completed with information bits in order to permit the separation of voice and data frames at the network side. A characteristic of the described solution is that it depends on the air interface protocol and that the means for separation of voice and data are integrated with the network. This solution is therefore not useful for solving the problem of simultaneous voice and data between a first mobile user terminal and a second service node that is external to and independent of the telecommunication networks involved in the speech path between the nodes.

It is further becoming common to adopt speech recognition methods for speech control of user services. A disadvantage with known methods is the need to "train" the speech recognition system to understand a specific vocabulary, language characteristics and even characteristics of the voice of the speaking person.

SUMMARY

It is therefore an object of the present invention to provide techniques for adapting non-speech data for transmission via a coded voice channel in an air interface in a mobile telecommunications system (e.g., a GSM-system), so that the air interface will accommodate the in-band signaling that has been described above with respect to the land-based communications systems.

It is a farther object of the present invention to provide a common "language" for interfacing with user service nodes that utilize speech recognition techniques as a control interface.

In accordance with one aspect of the present invention, the foregoing and other objects are achieved in techniques and apparatus for transmitting a digital input symbol to a receiver. This is accomplished by determining one or more formant frequencies that correspond to the digital input symbol, and generating a signal having the one or more formant frequencies. The signal may then be supplied for transmission over a voice channel. The signal is particularly suited for this purpose because it comprises formant frequencies, which the voice channel is particularly adapted for. For example, the signal may be supplied to a voice coder that generates an encoded signal for transmission over a voice channel.

In another aspect of the invention, a preprogrammed addressable memory is utilized to perform the mapping between the set of input symbols and the set of corresponding formant frequencies. In particular, the step of determining one or more formant frequencies that correspond to the digital input symbol comprises the steps of supplying the digital input symbol to an address input port of an addressable memory means, wherein the addressable memory means has formant frequency codes stored therein at addresses such that when the digital input symbol is supplied to the address input port of the addressable memory means, a corresponding formant frequency code appears at an output port of the addressable memory means. The corresponding formant frequency code appearing at the output port of the addressable memory is then used as an indicator of the determined one or more formant frequencies.

In still another aspect of the invention, the corresponding formant frequency code indicates a sequence of formant frequencies. Then, the step of generating the signal having the one or more formant frequencies comprises the step of generating the sequence of formant frequencies indicated by the corresponding formant frequency code.

In yet another aspect of the invention, a Forward Error Correction (FEC) code is also transmitted with the formant frequencies over the voice channel. In particular, a forward error correction code is determined for the digital input symbol, and the one or more formant frequencies are modified as a function of the forward error correction code. Then, a signal having the one or more modified formant frequencies are generated for transmission over the voice channel. The modification may, for example, affect a volume attribute or a pitch attribute of the one or more formant frequencies.

In yet another aspect of the invention, both speech and digital input symbols may be transmitted to a receiver. This includes transmitting the speech to the receiver by means of a voice channel. When it is desired to transmit data, a change to a data transmission mode is made by automatically generating a predetermined sequence of formant frequencies and transmitting the automatically generated formant frequencies to the receiver by means of the voice channel. This signals the change in mode to the receiver. Then, the digital input symbols are mapped onto a corresponding formant sequence. A signal representing the corresponding formant sequence is then transmitted to the receiver by means of the voice channel.

In still another aspect of the invention, a return to a speech transmission mode may be made by automatically generating a second predetermined sequence of formant frequencies and transmitting the automatically generated second sequence of formant frequencies to the receiver by means of the voice channel. The second predetermined sequence of formant frequencies is the mechanism for signaling to the receiver the change in mode.

In yet another aspect of the invention, control signals for controlling a speech-controlled automated server may be generated by converting a spoken command into a first command signal, and supplying the first command signal to speech recognition means. The speech recognition means is used to determine one or more formant frequencies that correspond to the first command signal, wherein the one or more formant frequencies constitute a command that is recognizable by the automated server. A second command signal is then generated having the one or more formant frequencies. This feature permits almost any user to interface with an automatic server because the user's spoken commands are, in effected, "translated" into another set of formant frequencies that the automated server has been trained on.

BRIEF DESCRIPTION OF THE DRAWINGS

The objects and advantages of the invention will be understood by reading the following detailed description in conjunction with the drawings in which:

FIG. 4 is a block diagram of an exemplary apparatus for retrieving FEC information at the receiver, and determining whether the data symbols have been received without errors, in accordance with one aspect of the invention, FIG. 5A is a block diagram of an apparatus for adapting any user's speech command into a standard set of formant frequencies for controlling an automated server having speech recognition hardware, in accordance with one aspect of the invention;

DETAILED DESCRIPTION

Figure 1A:
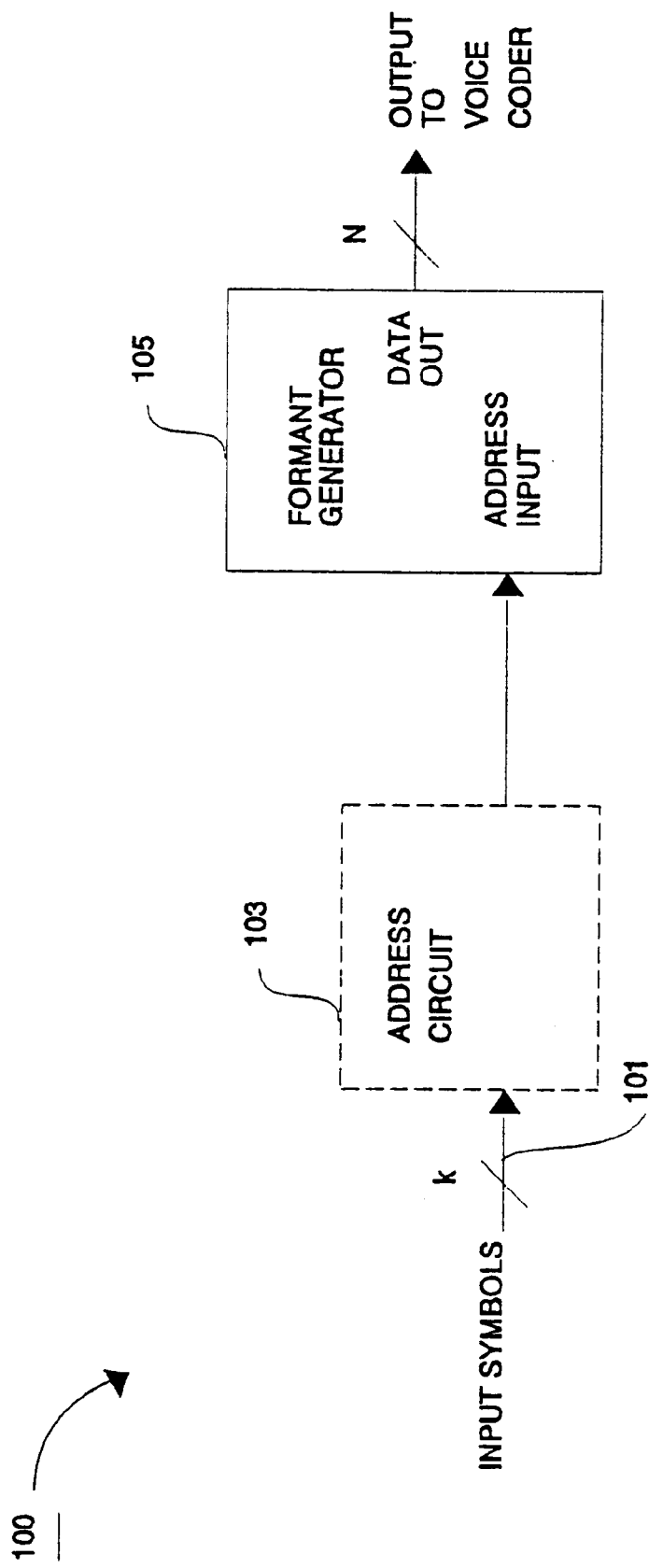
FIGS. 1A, 1B and 1C are block diagrams of exemplary embodiments of apparatus for communicating input symbols over a speech channel in accordance with one aspect of the invention.

The various features of the invention will now be described with respect to the figures, in which like parts are identified with the same reference characters.

The invention includes methods and apparatus that enable in-band signaling to be used in connection with a voice coder without the disadvantages of the known tone signaling techniques described in the BACKGROUND section of this disclosure. These and other advantages are obtained by means of techniques that rely on the areas of speech synthesis and speech recognition. In one aspect of the invention, digital information is converted into formant sequences that may be easily transmitted by a transceiver's voice coder. It is well-known in, for example, the art of human speech synthesis, that a formant is a vocal-tract resonance. Because formant signals have the same frequency characteristics as actual human speech, such signals may be easily converted by a standard voice coder (found in conventional transceivers) for transmission to a receiver. In this way, the problem associated with the transmission of other types of tones, such as DTMF signals, is avoided.

An "alphabet" of formant frequencies (or combinations of formant frequencies) is predefined to represent all possible values of the digital information, so that the conversion for transmission involves mapping a given unit of digital information onto a corresponding formant sequence, and then transmitting a signal representing the corresponding formant sequence. The predefined "alphabet" is preferably such that it is easily differentiated from the normal flow of speech data. At the receiver side, the received formant frequency (or combination of formant frequencies) is then converted back to the corresponding digital information by means of a reverse mapping process.

In another aspect of the invention, techniques for switching between speech communication and data communication on a common communication channel are provided. A more detailed description of these and other aspects of the invention follows.

FIG. 1A is a block diagram of an exemplary apparatus for communicating input symbols over a speech channel in accordance with one aspect of the invention. In the inventive input symbol-to-formant frequency encoder 100, input symbols 101 comprising bit patterns of equal length k are supplied to an address circuit 103, which performs translates (or maps) the input symbol 101 onto another bit pattern as necessary for the particular embodiment. For example, the address circuit 103 may add a base offset to the input symbols 101. It will be recognized that the address circuit 103 is not an essential feature of the invention, and may be eliminated in some embodiments. To designate the fact that the address circuit 103 is an optional element, it is depicted in dotted lines in the figure. The output of the address circuit 103 is supplied to an address (or data) input port of a formant generator 105. The formant generator 105 is a means for generating one of $2^k$ possible expanded codes that represent the predefined formant combinations. The particular expanded code that is generated by the formant generator 105 is a function of the particular "address" (or input symbol 101) that is supplied to its input. Each of the expanded codes is N-bits wide, and each corresponds to one of the k-bit wide input symbols.

Figure 1B:
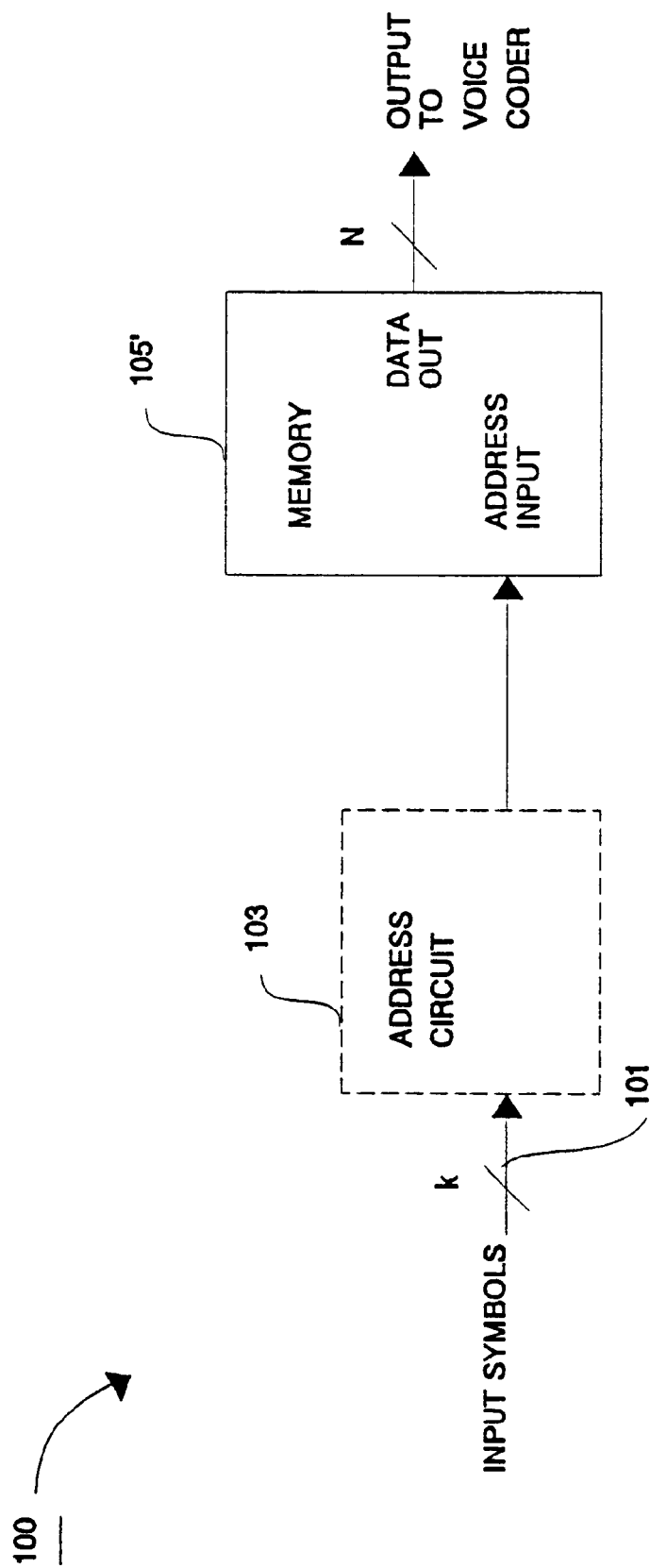

The formant generator 105 may be implemented in any of a number of different ways. For example, one having ordinary skill in the art would be capable of designing a hard-wired logic circuit to perform the desired translation between input symbols 101 and the N-bit wide expanded code. In another embodiment, illustrated in FIG. 1B, a pre-programmed memory 105' performs this task. The memory 105' must have at least $2^k$ storage locations to be able to store an expanded code for each possible k-bit wide input symbol. In this embodiment, each of the expanded codes is stored at a particular address within the memory 105' such that it will be supplied at the memory's data output port whenever the corresponding input symbol (or translated address, output from the address circuit 103) is supplied to the memory's address input port. In this way, the memory 105' is used as a device for mapping the input symbols into the corresponding expanded code. Although the memory 105' may advantageously be designed to be a non-volatile memory unit (e.g., a read-only memory), this is not a requirement.

As mentioned above, in some embodiments each N-bit wide expanded code value may represent a combination of formant frequencies. In one such embodiment, illustrated in FIG. 1C, the expanded code is in the form of j formants which are combined (e.g., added) to form the N-bit expanded code that will be supplied to a voice coder. In one embodiment, the number j may be the number of formants necessary for generating one phoneme. A phoneme is well-known to be the most basic unit of sound in a language, that is, it is the smallest difference in sound that distinguishes one word from another. The English language is typically described as having 44 or 45 phonemes.

Figure 1C:
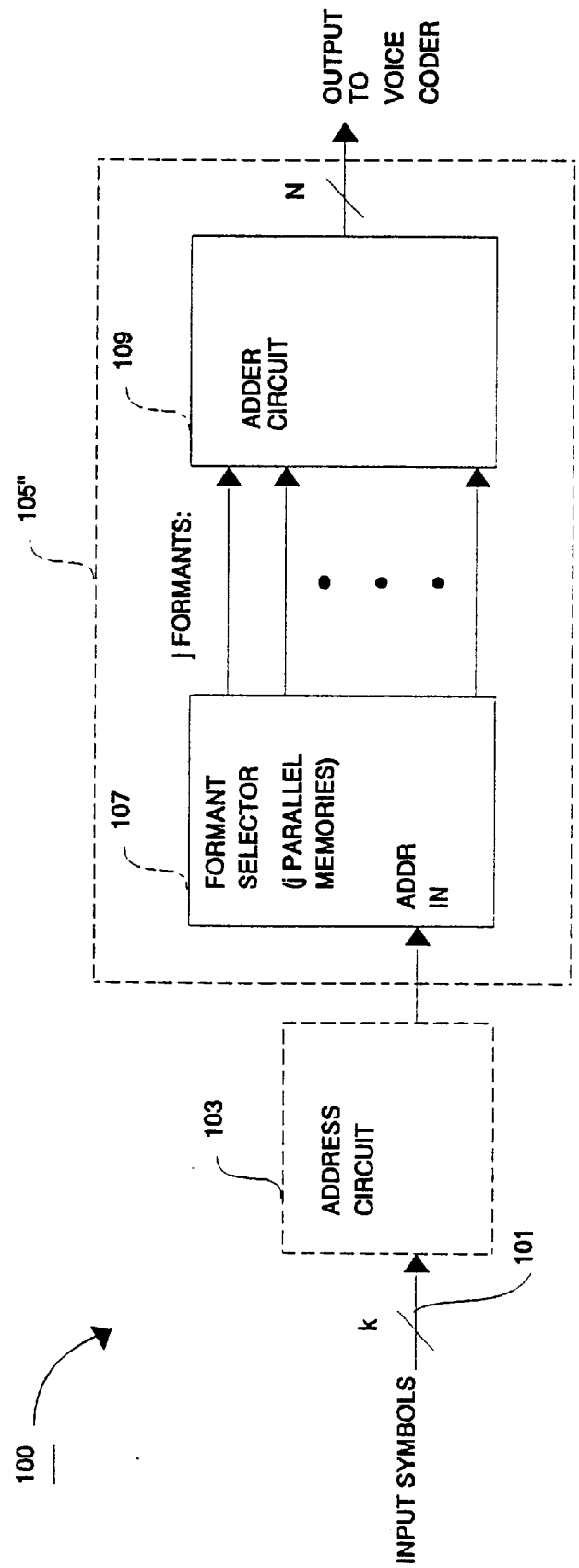

In the exemplary embodiment of FIG. 1C, the formant generator 105" comprises two components: a formant selector 107 and an adder circuit 109. The formant selector 107 may be constructed as a number, j, of addressable memories, operating in parallel. An input symbol 101 (or translated address, output by the address circuit 103) is supplied to the formant selector 107. Each of the j addressable memories within the formant selector 107 responds to the supplied address by outputting the contents of the location addressed thereby. Each of the outputs represents a formant which is then supplied to, for example, an adder circuit 109, which combines the j formants to generate the N-bit wide expanded code.

Figure 2:
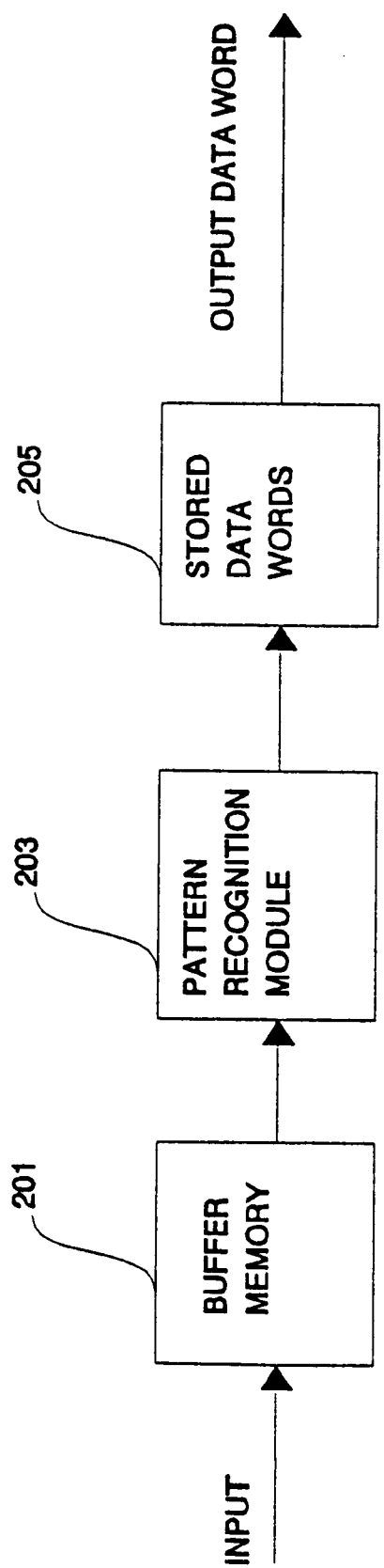
FIG. 2 is a block diagram depicting an exemplary embodiment of an apparatus for receiving input symbols transmitted over a speech channel in accordance with one aspect of the invention.

FIG. 2 is a block diagram depicting an exemplary embodiment of an apparatus for receiving input symbols transmitted over a speech channel in the form of formants as described above. In the exemplary apparatus, the received formants (designated "INPUT" in the figure) are stored in a buffer memory 201, from which they are later analyzed. In particular, a pattern recognition module 203 examines the received digital bit patterns representing the transmitted formants (or combinations of formants) and identifies which symbols correspond to those patterns. The output of the pattern recognition module 203 is an address for selecting a corresponding one of a plurality of data symbols (words) that have been stored at different addresses in an addressable memory 205.

As stated above, each input symbol may be encoded as a corresponding formant, as a combination of two or more formants. In order to facilitate a discussion of the invention, the term "speech unit" will be used, and should be construed to mean either a single formant that represents a symbol, or a combination of formants that, together, represent a symbol. Turning now to another aspect of the invention, when transmitting digital information over a channel, it is common to utilize forward error correction (FEC) techniques in order to ensure the integrity of the received data. FEC techniques typically involve appending additional information bits to the transmitted data, which additional bits may be utilized to detect and possibly correct errors in the received data. In another aspect of the invention, FEC techniques may be applied to the transmission of the input symbols by utilizing context as a means for conveying the additional FEC-related information (e.g., checksum bits) in the transmitted sequence of speech units. Such context dependence can, for example, be implemented as a modification of the default symbols stored in a memory (e.g., the memory 105') as described above. For example, consider a stream of input symbols that are mapped onto a stream of speech units, A, B, C . . . P, Q. The speech unit Q has at least one predecessor sequence, namely, A, B, C . . . P. This predecessor part may be mapped onto an address, (A, B, C . . . P), that may be used to address a modifying speech unit applied to the speech unit Q. The modification itself represents the additional information corresponding to the additional FEC-related information described above. The type of modification might correspond to such qualities as volume, pitch, and the like, in ordinary voice communication. At the receiver side, the modification is detected and reverse-mapped to determine the FEC-related information that were transmitted with the received symbol. These FEC-related information may be used for verifying that the string was correctly received.

Figure 3:
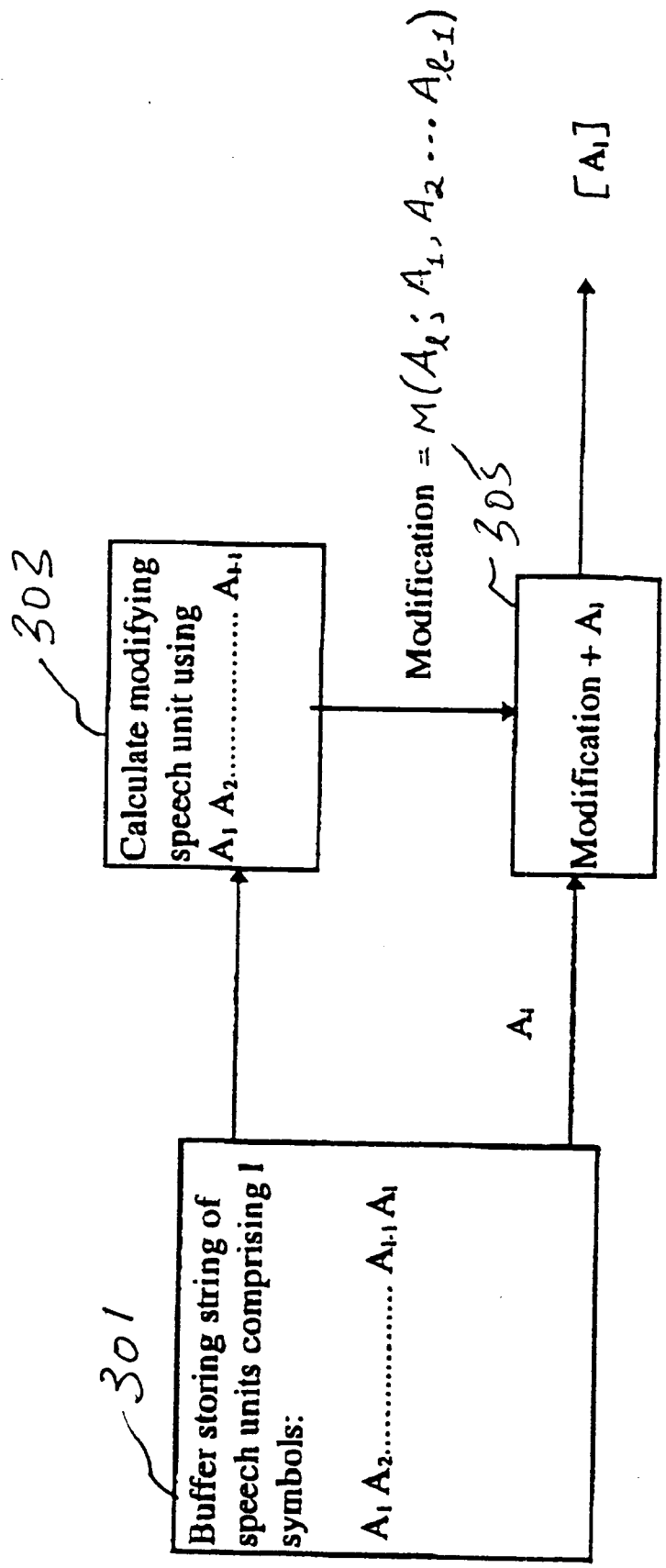
FIG. 3 is a block diagram of an exemplary apparatus for modifying a speech unit A, so as to encode forward error correction information in accordance with one aspect of the invention.
Figure 6A:
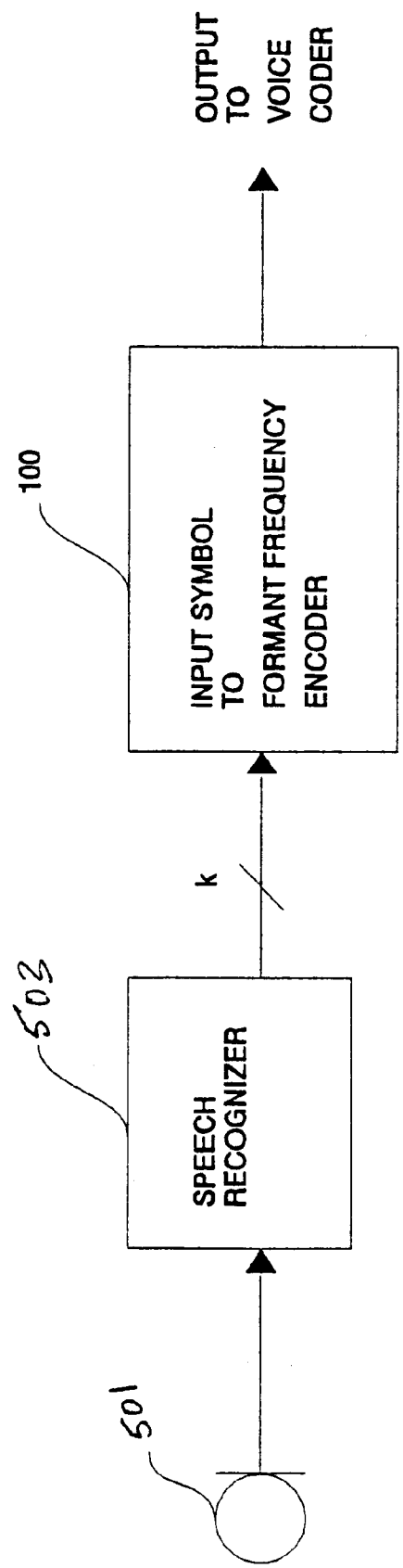
FIGS. 6 and 7 depict, respectively, an exemplary embodiment of transmitter and receiver hardware for enabling a change of modes between voice transmission and data transmission on the same voice channel.

Given a string of l speech units, designated $A_1, A_2, \ldots A_{l-1}, A_l$, let the modification of $A_l$ be denoted $M(A_l; A_1, A_2, \ldots A_{l-1})$, and the modified speech unit so generated denoted by $[A_l]$. A block diagram of an exemplary apparatus for modifying the speech unit $A_l$ will now be described with reference to FIG. 3. A buffer 301 is provided for storing the sequence of speech units, $A_1, A_2, \ldots A_{l-1}, A_l$. A modification calculation unit 303 has access to the buffer 301, and retrieves the l–1 previous speech units in the sequence. As mentioned above, the calculation is preferably performed by deriving an address from the speech units $A_1, A_2, \ldots A_{l-1}$. The address thus formed is used to access an addressable memory (not shown) to obtain therefrom the modification, which has been determined in advance for each possible address.

A modifying unit 305 receives the modification from the modification calculation unit 303. The modifying unit 305 also accesses the buffer 301 to retrieve therefrom the speech unit, $A_l$, to be modified. The modification unit 305 then modifies the speech unit $A_l$ in accordance with the type of modification being performed (e.g., pitch and/or volume modification), and outputs the modified speech unit.

FIG. 4 is a block diagram of an exemplary apparatus for retrieving the FEC information at the receiver, and determining whether the data symbols have been received without errors. The exemplary apparatus includes two buffers: a first buffer 401 stores a string of received speech units, one of which is the modified speech unit $[A_l]$. A second buffer 403 stores a string of the most recently decoded speech units. Where the FEC information is determined based on a number, l–1, speech symbols, then the second buffer 403 should be capable of storing at least l–1 most recently decoded speech units.

The second buffer 403 supplies the l–1 most recently decoded speech symbols to a modification calculation unit 405, which determines an expected modification. The modification calculation unit 405 may operate utilizing the same principles as those of the modification calculation unit 303 described above with reference to FIG. 3.

A speech unit calculation unit 407 determines the received speech unit based on the expected modification value (supplied by the modification calculation unit 405) and the most recently received modified speech unit $[A_l]$ (supplied by the first buffer 401). The received speech unit is derived by performing an inverse modification function (represented as $[\ ]^{-1}$) on the received modified speech unit $[A]$. For example, where the modification is in the form of a waveform that was originally added to the speech unit $A_l$, then the inverse modification would involve subtracting the expected modification from the most recently received modified speech unit $[A_l]$.

A data symbol decoder 409 accepts the received speech unit, and performs a reverse mapping to derive the corresponding data symbol, which is presented at a first output. To perform this reverse mapping, the data symbol decoder 409 compares the received speech symbol (from the speech unit calculation unit 407) with the stored "vocabulary" of predefined speech units, and identifies which of the predefined speech units is the closest match. The address of the closest matching predefined speech unit may then be used to either directly or indirectly identify the corresponding decoded data symbol, which is then supplied at the first output 415.

A second output 417 of the data symbol decoder 409 supplies the closest matching predefined speech unit to a received modification calculation block 411. The closest matching predefined speech unit is now treated like the most likely transmitted speech unit. The received modification calculation block 411 operates by determining what modification was performed that, when applied to the most likely transmitted speech unit, would generate the most recently received modified speech unit, $[A_l]$. For example, where the modification is in the form of a waveform that is added to a speech unit, determining the received modification could be performed by subtracting the most likely transmitted speech unit from the most recently received modified speech unit, $[A_l]$. The difference in this case is the actual received modification.

Both the actual received modification (from the received modification calculation block 411) and the expected modification (supplied by the modification calculation unit 405) are supplied to an error detection unit 413 which compares the two and generates an error signal when there is a mismatch. This error signal may be used to determine whether the decoded data symbol appearing at the first output 415 of the data symbol decoder 409 is valid. The comparison between the received modification and the expected modification may be performed in accordance with well-known algorithms for determining a "distance" between the two.

In another aspect of the invention, the transmission of the symbols is discontinuous, whereby breaks are inserted between transmitted symbols. This makes it easier to detect the beginnings and ends of received symbols, and thereby facilitates the use of known methods, such as pattern matching, for recognition of the symbols. One drawback with the use of discontinuous transmission of the symbols is that it reduces the data transmission rate. By contrast, the use of continuous transmission of symbols eliminates this problem, but requires more complex technologies to perform the decoding oil the receive side of the transmission.

In still another aspect of the invention, the formant frequencies for representing the various speech units are selected from only those formant frequencies corresponding to voiced (as opposed to unvoiced) sound. This may be used in combination with another aspect of the invention in which strings of p symbols, comprising exclusively voiced speech units, are separated by unvoiced speech units. This is advantageous because it facilitates the job of detecting the end of one sequence of speech units and the start of a next sequence of speech units.

The invention, as thus far described, may be advantageously applied to solve a number of problems in communications. For example, it is known to allow users to establish telephone connections with automated servers that can perform any of a countless number of services for the user. Such services might include, for example, providing information to the user (e.g., telephone directory information), or allowing the user to place an order for some product made available by the automated service provider.

Furthermore, it is known to utilize speech recognition hardware at an automated server, in order to permit a user to issue voice commands for controlling the automated server.

One problem with this arrangement, however, is that voice recognition hardware is typically trained for recognition of speech articulated by a certain group of people (e.g., a group of people having a particular native language). This means that anyone speaking a different language, or even the same language but with particular speech characteristics (e.g., a foreign or regional accent), would encounter difficulties having his or her speech commands recognized by the automated server. The invention may be applied to solve this problem.

An exemplary embodiment of one such solution is shown in FIG. 5A. Here, the same input symbol-to-formant frequency encoder 100 as is illustrated in FIG. 1 is used. In order to permit virtually anyone to utilize an automated server having speech recognition hardware, a microphone 501 or other input device is provided to receive acoustic energy from the user, and to convert the acoustic energy into a corresponding signal. The signal is provided to a speech recognizer 503 that has been trained to recognize the speech of this particular user. This means that the speech recognizer 503 has been trained to recognize the particular language and the particular accent of the user, and in particular, the speech recognizer 503 should be trained to recognize commands that the user would say while communicating with the automated server (not shown).

The output of the speech recognizer 503 is preferably one of a number of predefined symbols. The symbols are then supplied to the input of the input symbol-to-formant frequency encoder 100, which converts the received input symbol into a corresponding superposition of formant frequencies as fully described above. In particular, the corresponding formant frequencies are selected to be those that the automated server (not shown) has been trained to recognize and respond to. In this way, the speech of different users, perhaps even speaking different languages, is converted into a common "language" that is easily recognizable by the automated server.

In one embodiment, the speech recognizer 503 may be implemented in a mobile terminal for use in a cellular telephone system. Speech recognition systems are available that can be integrated with a personal mobile phone and trained for adaptation to the voice characteristics of the ordinary user of the phone, and therefore need not be described here in detail.

Figure 5B:
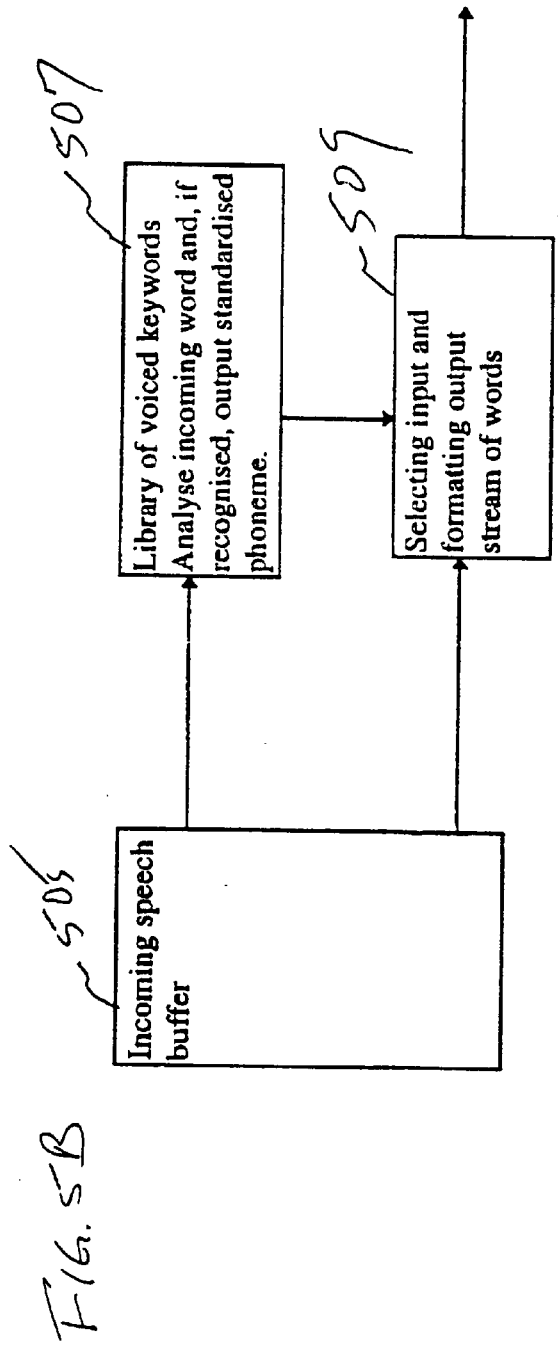
FIG. 5B is a block diagram of an apparatus for adapting any user's speech command into a standard set of formant frequencies for controlling an automated server having speech recognition hardware, and for intermixing the generated formant frequencies with other speech provided by the user, in accordance with one aspect of the invention.

In a more elaborate configuration, illustrated in FIG. 5B, a system is capable of intermixing a user's own speech with predefined symbols as described above. In this embodiment, a buffer 505 is provided for storing incoming speech supplied by the user. An analysis unit 507 includes a library of voiced keywords. These keywords, possibly including synonyms, are pronounced by the user in order to train the mobile terminal speech devices to understand these words. During the training process, the user may browse through the memory that stores a plurality of commonly used keywords. The words may be displayed to the user, and the user responds by pronouncing the word. By pressing a button, the user may additionally indicate that a synonym follows.

Figure 5C:
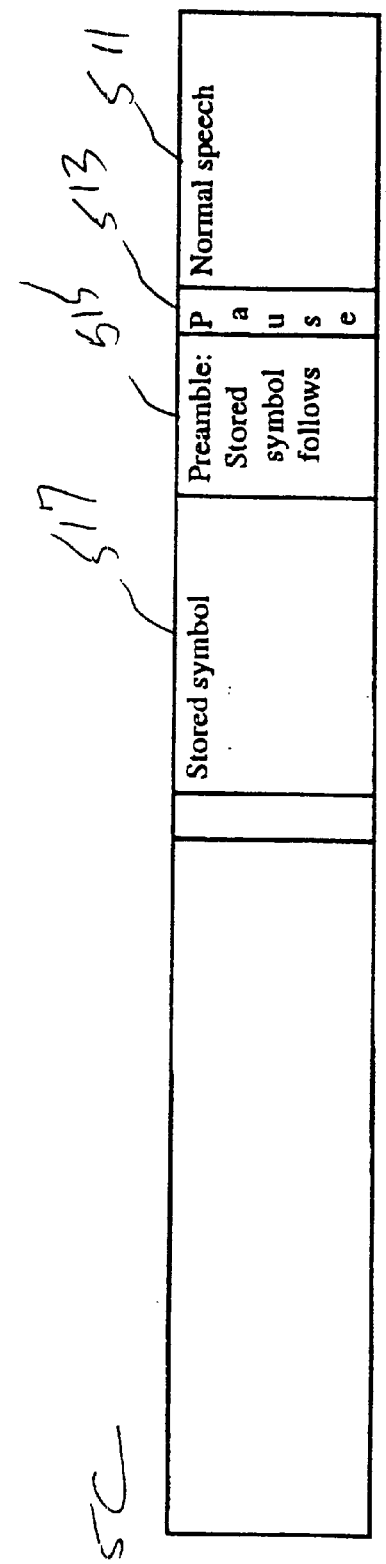
FIG. 5C is a diagram of an exemplary output format that mixes automatically generated keywords with the user's own speech.

When the user requests services as a voiced request, the analysis unit 507 examines the user's speech as supplied by the buffer 505, and picks up the keywords and transforms these into a standardized format as explained above. Those words that are not recognized may be inserted unchanged into the stream of words for transmission. A formatting unit 509 performs the task of generating an output format that mixes the generated keywords with the user's own speech. An exemplary format is illustrated in FIG. 5C, in which a predefined preamble 515 signals the fact that a stored symbol 517 will follow. A pause 513 that is inserted between the normal speech 511 and the preamble 515 assists the receiver's pattern recognition hardware with the task of recognizing the preamble 515.

At the receive side, speech recognition circuits may be provided for interpreting the user's additional words. In this way, the keywords will always be recognized by the service node and the additional speech passed along may be analyzed at the receiving side to further ascertain that a correct message is transferred, thereby enabling the receiving side to get as much information as possible from the received message.

Another exemplary application of the invention is to inform a user of a mobile terminal about who is placing an incoming call so that, for example, screening or other analysis can take place before the user accepts the call. According to this aspect of the invention, the terminal can exchange data with, for example, a service node even before an alert signal is sounded. As mentioned above, such data exchange may be of interest, for example, to inform the receiver about who is calling in order for screening or other analysis to take place. Such an exchange of a "business card" would normally require the status of the channel to be changed to support data communication. However, with the present invention, the same voice channel can be used for the data exchange as well as for the subsequent voice communication.

In yet another exemplary application of the invention, the channel can be used to transfer information, like short messages or alert messages, to the terminal on the voice band. This gives the server a possibility to immediately page the user without any delay. This can be done both when there is no voice communication or during an ongoing conversation.

In still another exemplary application, the user may send short messages or commands to the server both during voice conversation and when no communication is going on. The server may be the receiver of the information or it may transfer it to the final destination on any bearer channel.

In yet another exemplary application, the invention may be used to implement a shared "whiteboard" (i.e., a display that the user can modify by, for example, drawing on it, and which is reproduced at another display terminal). For example, the user may have a shared "whiteboard" on the screen of the client device. The whiteboard is shared with another user connected over a server. During the voice conversation, either of the users may point to his or her display, mark objects on the display, or draw lines. These actions, which are reproduced at the other user's display terminal, do not require much bandwidth to be transferred to the other party.

Because the same voice channel is used for both data and speech, there is a desire for a mechanism that enables the particular mode (i.e., voice or data) to be controlled. This desire is addressed in accordance with still another aspect of the invention, which will be described with reference to FIGS. 6 and 7. The initiator of mode setting can be either a client having terminal equipment (e.g. a fixed or a mobile phone) or a server. Mode setting is executed by an initiating party disconnecting all voice equipment. In the case in which the initiating party (i.e., the party initiating the mode change) is a client, this would include disconnecting equipment such as a microphone or loudspeaker. Where the initiating party is a server, the equipment to be disconnected may include any connected device or another client.

Figure 6:
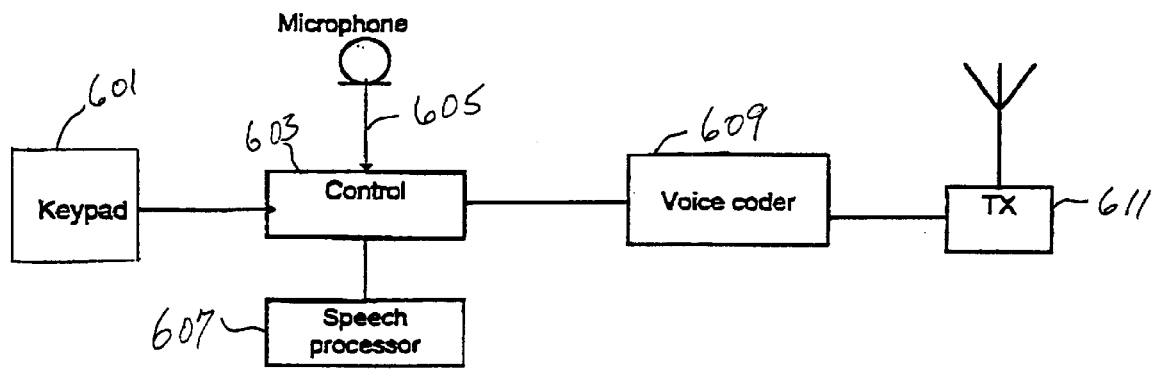

FIG. 6 illustrates an exemplary client's terminal equipment having the ability to initiate a mode change in accordance with the invention. Here, a keypad 601 is connected to a control unit 603. By activating one or more keys on the keypad 601, the user may cause the control unit 603 to disconnect a microphone 605. The control unit 603 then activates a speech processor 607 which generates a preprogrammed. (i.e., predefined) sequence of symbols (i.e., in the form of a sequence of formant frequencies as explained above), here designated as "X". The predefined symbols are passed along to a voice coder 609, which processes the sequence of symbols in the usual manner and passes them along to a transmitter 611.

Figure 7:
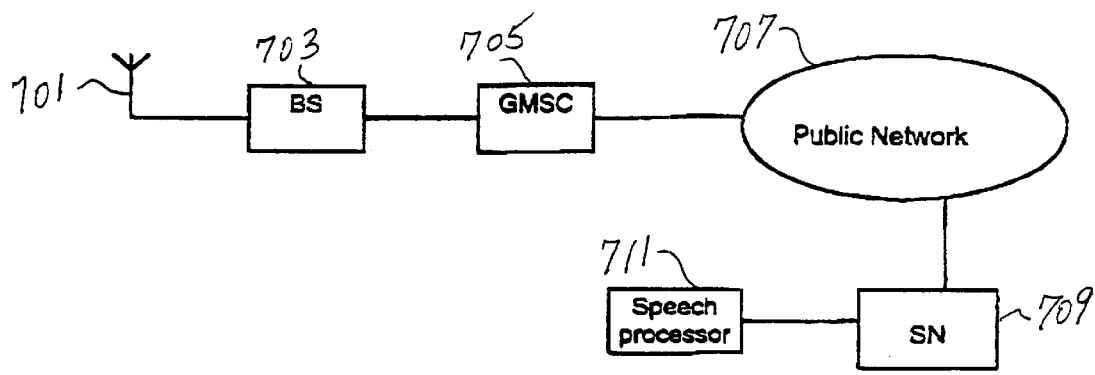

FIG. 7 illustrates an example of the equipment on the other side of the connection. The predefined sequence of symbols, X, are received by an antenna 701 and forwarded through a base station 703 a gateway mobile switching center (GMSC) 705 and a public network 707 to the intended service node 709. The service node 709 has a speech processing unit 711 that recognizes the transmitted sequence of symbols, X, and informs the service node 709 of this recognition. In response to recognizing the sequence of symbols, X, the service node 709 transmits a predefined sequence of acknowledgment symbols, Y, to the client, and disconnects any connected voice equipment or other connected parties.

At the client, the speech processing unit 607 recognizes the sequence of symbols, Y, and informs the control unit 603 of this recognition. In response, the control unit 603 stops sending the sequence X, and sets the mode of the client for data communication. The service node, upon detecting the cessation of symbol sequence X transmission, then sets its mode for data communication. Data communication then takes place as fully described above.

When it is desired to stop data communication and return to voice communication, this is easily achieved by exchanging a predefined set of data sequences which, when recognized by the recipient, will cause the control unit 603 and the service node 709 to perform the mode switch (including reconnection of any voice and other equipment that had been disconnected in preparation for the data communication).

The above-described apparatus and techniques permit data communication to take place on a coded voice channel (e.g., a GSM-channel or any other mobile system using digital coded communication) by means of in-band signaling. The apparatus and techniques are independent of the type of speech coder employed, and may be advantageously applied to perform such tasks as establishing signaling over a plurality of various networks to command a service computer. Another benefit of the inventive apparatus and techniques is the possibility of marking up a voice communication, such as separating a header and body part of a voice message. For example, a user might be provided with the capability of marking up a message by pressing a button that causes the generation of header data symbols designating a particular receiver of the message. As another example, a user might use this real-time mark-up capability to insert data that would give the address of a web page at which the receiver could find and retrieve a relevant picture.

In this aspect of the invention, a predefined mark is used to separate the header part from the body (i.e., message) part. The header part and the body part both comprise voiced information sections.

Another application of such a mark up procedure would be to allow for the inclusion of supplemental information with voiced messages that are left by a calling party. The supplemental information may, for example, be an originating code like a calling subscriber identity or name of calling party. When the called party accesses the messages, he or she will see this supplemental information which may be helpful for selecting message to listen to. The supplemental information can be supplied in a number of ways:

1) The information may be stored in the calling party's terminal, and sent in response to a request made by the called party's voice mail box (e.g., in the same way that terminal identities are exchanged when a facsimile is sent).

2) The information may be stored in the calling party's terminal and sent in response to a calling party action, such as pressing a key on the terminal.

3) The information may be entered and transmitted manually by calling party either before or after recording the voice message.

The invention provides many advantages in communication resulting from the fact that voice and data can be mixed in a way that is transparent to the underlying communication system that links the communicating parties. This means, for example, that a message, created according to the invention as a data message, can be stored in a receiver's ordinary voice mail box. An identification symbol in the stored message can, for example, be used to define the message as a data message, whereby the receiver can receive the message in, for example, printed form.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating control signals for controlling an automated server, the method comprising the steps of:
   converting a spoken command into a first command signal;
   supplying the first command signal to speech recognition means;
   using the speech recognition means to determine a first set of one or more formant frequencies that corresponds to the first command signal;
   using the first set of one or more formant frequencies to determine a second command signal comprising a second set of one or more formant frequencies, wherein the second command signal is recognizable by the automated server; and
   generating a second command signal having the second set of one or more formant frequencies.

2. An apparatus for generating control signals for controlling an automated server, the apparatus comprising:
   means for converting a spoken command into a first command signal;
   speech recognition means, coupled to receive the first command signal, for determining a first set of one or more formant frequencies that corresponds to the first command signal;

means for using the first set of one or more formant frequencies to determine a second command signal comprising a second set of one or more formant frequencies, wherein the second command is recognizable by the automated server; and means for generating a second command signal having the second set of one or more formant frequencies.

3. A method of generating control signals for controlling an automated server, the method comprising the steps of:

supplying a spoken command to a speech recognition unit;

if the spoken command is recognized by the speech recognition unit, then mapping the spoken command to one or more formant frequencies;

transmitting the one or more formant frequencies to the automated server; and if the spoken commands is not recognized by the speech recognition unit, then transmitting the spoken command in its original form to the automated server.

4. An apparatus for generating control signals for controlling an automated server, the apparatus comprising:

speech recognition means for receiving a spoken command, wherein said speech recognition means is configured to:

map the spoken command to one or more formant frequencies if the spoken command is recognized by the speech recognition means;

transmit the one or more formant frequencies to the automated server; and transmit the spoken command to the automated server in its original form if the spoken word is not recognized by the speech recognition.

* * * * *